US010356447B2

(12) United States Patent
Shanson

(10) Patent No.: US 10,356,447 B2
(45) Date of Patent: Jul. 16, 2019

(54) METHODS AND SYSTEMS FOR DETERMINING A VIDEO PLAYER PLAYBACK POSITION

(71) Applicant: Pluto Inc., Los Angeles, CA (US)

(72) Inventor: Spencer Shanson, Menlo Park, CA (US)

(73) Assignee: Pluto Inc., West Hollywood, CA (US)

(\*) Notice: Subject to any disclaimer, the term of this patent is extended or adjusted under 35 U.S.C. 154(b) by 0 days.

(21) Appl. No.: 15/714,931

(22) Filed: Sep. 25, 2017

(65) Prior Publication Data

US 2019/0098344 A1  Mar. 28, 2019

(51) Int. Cl.
*H04N 21/234* (2011.01)
*H04N 21/24* (2011.01)
(Continued)

(52) U.S. Cl.
CPC ......... *H04N 21/23424* (2013.01); *H04L 9/16* (2013.01); *H04L 65/601* (2013.01); *H04N 21/2407* (2013.01); *H04N 21/812* (2013.01)

(58) Field of Classification Search
CPC ......... H04N 21/23424; H04N 21/2407; H04N 21/84; H04N 21/812; H04L 65/601;
(Continued)

(56) References Cited

U.S. PATENT DOCUMENTS 6,378,129 B1  4/2002 Zetts
6,625,811 B1  9/2003 Kaneko
(Continued)

FOREIGN PATENT DOCUMENTS

EP  0 594 350 A1  4/1994
GB  2343051 A  4/2000
(Continued)

OTHER PUBLICATIONS

PCT Search Report and Written Opinion dated Feb. 26, 2018 received in International Patent Application No. PCT/US2017/039960.
(Continued)

*Primary Examiner* — Benjamin R Bruckart
*Assistant Examiner* — Tien M Nguyen
(74) *Attorney, Agent, or Firm* — Knobbe, Martens, Olson & Bear LLP

(57) ABSTRACT

Systems and methods enable the determination of a playback position of a video player. A request is received, at a system over a network from a user device, for an item of video content. Interstitial content is received. The interstitial content is segmented into segments and the segments are encrypted. A given decryption key is associated with a respective locator, such as a URL. A playlist manifest file is generated that includes locators corresponding to segments of the requested item of video content, segments of the interstitial content, and decryption keys for respective encrypted interstitial segments. The generated playlist manifest file is transmitted to the user device. A request for a first decryption key for an encrypted first interstitial segment is received, and based on the request, a playback position of the video player is determined. A corresponding message, indicating the playback position, may be transmitted to a remote destination.

27 Claims, 5 Drawing Sheets

(51) Int. Cl.
*H04L 29/06* (2006.01)
*H04L 9/16* (2006.01)
*H04N 21/81* (2011.01)

(58) Field of Classification Search
CPC ....... H04L 9/16; H04L 9/3247; H04L 63/062; H04L 63/0428; H04L 9/12; H04L 9/0894
See application file for complete search history.

(56) References Cited

U.S. PATENT DOCUMENTS

| | | | |
|---|---|---|---|
| 8,005,826 B1 | 8/2011 | Sahami et al. | |
| 8,418,195 B1 | 4/2013 | Page | |
| 8,533,761 B1 | 9/2013 | Sahami et al. | |
| 8,572,649 B1 | 10/2013 | Gossweiler, III et al. | |
| 8,578,042 B2 | 11/2013 | Hu et al. | |
| 8,631,440 B2 | 1/2014 | Gossweiler, III et al. | |
| 8,826,443 B1 | 9/2014 | Raman et al. | |
| 8,886,745 B2 | 11/2014 | Kannan | |
| 9,112,623 B2 | 8/2015 | Blaxland | |
| 9,130,918 B2 | 9/2015 | Picconi et al. | |
| 10,063,612 B2* | 8/2018 | Brinkley | H04N 21/2668 |
| 2002/0038457 A1 | 3/2002 | Numata | |
| 2003/0074664 A1 | 4/2003 | Kwoh | |
| 2003/0149988 A1 | 8/2003 | Ellis et al. | |
| 2003/0212708 A1 | 11/2003 | Potrebic et al. | |
| 2003/0229900 A1 | 12/2003 | Reisman | |
| 2004/0117831 A1 | 6/2004 | Ellis et al. | |
| 2004/0123317 A1 | 6/2004 | Ozawa | |
| 2006/0294548 A1 | 12/2006 | Potrebic et al. | |
| 2007/0107010 A1 | 5/2007 | Jolna | |
| 2007/0204297 A1 | 8/2007 | Gonzalez | |
| 2007/0299877 A1 | 12/2007 | Cohen et al. | |
| 2008/0127257 A1 | 5/2008 | Kvache | |
| 2008/0271078 A1 | 10/2008 | Gossweiler et al. | |
| 2008/0271080 A1 | 10/2008 | Gossweiler et al. | |
| 2008/0306818 A1 | 12/2008 | Evans | |
| 2009/0070819 A1 | 3/2009 | Gajda et al. | |
| 2009/0133054 A1 | 5/2009 | Boggie | |
| 2009/0199114 A1 | 8/2009 | Lewis | |
| 2009/0204487 A1 | 8/2009 | Cansler | |
| 2009/0241145 A1 | 9/2009 | Sharma | |
| 2009/0259711 A1 | 10/2009 | Drieu et al. | |
| 2010/0325657 A1 | 12/2010 | Sellers et al. | |
| 2011/0030012 A1 | 2/2011 | Diaz Perez | |
| 2011/0153423 A1 | 6/2011 | Elvekrog | |
| 2011/0231660 A1* | 9/2011 | Kanungo | H04L 63/0435 713/168 |
| 2012/0102524 A1 | 4/2012 | Goldschmidt Iki et al. | |
| 2012/0110621 A1 | 5/2012 | Gossweiler, III | |
| 2012/0116869 A1 | 5/2012 | Vasudevan | |
| 2012/0144416 A1 | 6/2012 | Wetzer et al. | |
| 2012/0192232 A1 | 7/2012 | Ellis | |
| 2012/0272264 A1 | 10/2012 | Suzuki et al. | |
| 2013/0198642 A1 | 8/2013 | Carney | |
| 2013/0198779 A1 | 8/2013 | Moon | |
| 2013/0239136 A1 | 9/2013 | Babu | |
| 2013/0276032 A1 | 10/2013 | Walter et al. | |
| 2013/0305285 A1 | 11/2013 | Cook | |
| 2013/0305287 A1 | 11/2013 | Wong et al. | |
| 2013/0311780 A1* | 11/2013 | Besehanic | H04L 9/3247 713/176 |
| 2013/0312028 A1 | 11/2013 | Dharmaji et al. | |
| 2013/0332959 A1 | 12/2013 | Kothari | |
| 2013/0347018 A1 | 12/2013 | Limp | |
| 2014/0157312 A1 | 6/2014 | Williams et al. | |
| 2014/0189743 A1 | 7/2014 | Kennedy et al. | |
| 2014/0201791 A1 | 7/2014 | Angiolillo et al. | |
| 2014/0282667 A1 | 9/2014 | Major | |
| 2014/0282677 A1 | 9/2014 | Mantell | |
| 2014/0282736 A1 | 9/2014 | Elstermann | |
| 2014/0304756 A1 | 10/2014 | Fletcher | |
| 2014/0348491 A1* | 11/2014 | Redmann | H04N 21/2143 386/249 |
| 2014/0351843 A1 | 11/2014 | Theriault | |
| 2014/0366068 A1 | 12/2014 | Burkitt et al. | |
| 2015/0113547 A1 | 4/2015 | Wolf | |
| 2015/0128163 A1 | 5/2015 | Cormican | |
| 2015/0143413 A1 | 5/2015 | Hall | |
| 2015/0189347 A1 | 7/2015 | Oztaskent | |
| 2015/0237389 A1 | 8/2015 | Grouf | |
| 2015/0264450 A1 | 9/2015 | Jung | |
| 2015/0310498 A1 | 10/2015 | Brandstetter | |
| 2016/0112740 A1 | 4/2016 | Francisco | |
| 2017/0085962 A1 | 3/2017 | Maughan | |

FOREIGN PATENT DOCUMENTS

| | | |
|---|---|---|
| WO | WO 00/40021 A1 | 7/2000 |
| WO | WO 2004/077808 A2 | 9/2004 |
| WO | WO 2007/123613 A1 | 11/2007 |
| WO | WO 2008/007274 A2 | 1/2008 |
| WO | WO 2012/079054 | 6/2012 |

OTHER PUBLICATIONS

Extended European Search Report dated Aug. 4, 2017, Application No. 15749508.6.
Host. Oxford Dictionaries. Oxford University Press, n.d. Web. Sep. 3, 2016. <http://www.oxforddictionaries.com/us/definition/american_english/host>., 7 pages.
International Search Report and Written Opinion, dated May 21, 2015, in International Application No. PCT/US2015/015902, 14 pp.
Australian Examination Report regarding Application No. 2015218353, dated Nov. 2, 2018, 7 pages.
Examination Report dated Apr. 16, 2019, received in Australian Patent Application No. 2015218353.
Li et al., "Video Multicast over the Internet", IEEE Network, vol. 13, Issue: 2, pp. 46-60, Mar./Apr. 1999.

* cited by examiner

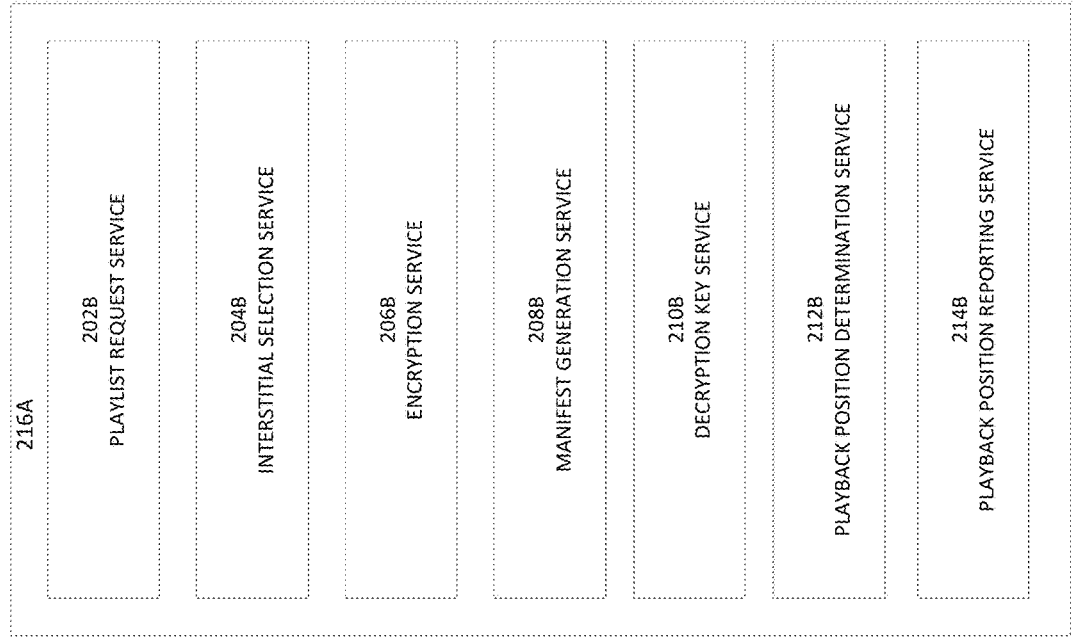

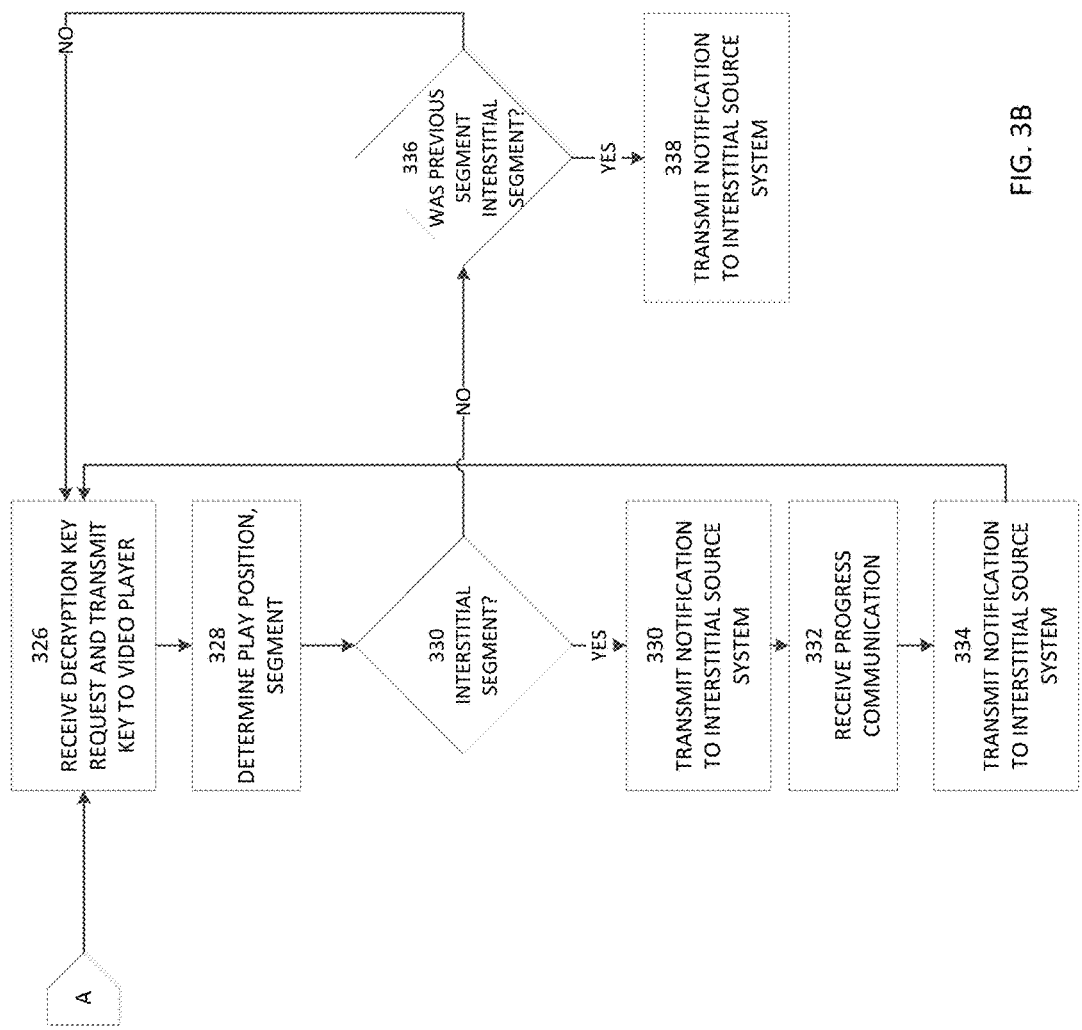

METHODS AND SYSTEMS FOR DETERMINING A VIDEO PLAYER PLAYBACK POSITION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to video players and in particular to routing video content to video players over a network.

Description of the Related Art

Items of video content from multiple sources may be routed over a network, such as the Internet, to a video player. For example, the video content may be routed using a video on demand system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to systems and methods that enable the determination of a playback position of a video player with respect to digital content. A request is received, at a system over a network from a user device, for an item of content, such as an item of video content. Interstitial content is accessed. The interstitial content is segmented into segments and the segments are encrypted. A given decryption key for a given interstitial content segment is associated with a respective locator, such as a URL. A manifest file is generated that includes locators corresponding to decryption keys for respective encrypted interstitial segments. The manifest file may optionally further include locators corresponding to segments of the requested item of video content and segments of the interstitial content. The generated manifest file is transmitted to the user device. A request for a first decryption key for an encrypted first interstitial segment is received, and based at least in part on the request, a playback position of the video player is determined. A corresponding message, indicating the playback position, may optionally be transmitted to a remote destination, such as the source of the interstitial content.

An aspect of the disclosure relates to a computer implemented method of determining a playback position of content being played by video player on a remote user device, the method comprising: receiving from the user device, over a network, a request for an item of video content at a first computer system via a network interface of the first computer system; accessing, by the first computer system, user information and/or metadata corresponding to the item of video content; transmitting, by the first computer system, at least a portion of the user information and/or metadata corresponding to the item of video content to one or more remote systems; receiving, by the first computer system, one or more items of interstitial content from one or more of the remote systems; segmenting, by the first computer system, the one or more items of interstitial content into a plurality of segments; encrypting, by the first computer system, the plurality of segments of the one or more items of interstitial content; for a given encrypted interstitial segment, associating, by the first computer system, a corresponding decryption key with a respective URL; generating, by the first computer system, a playlist manifest file to include URL entries in a playback sequence, the playlist manifest file comprising URLs corresponding to: segments of the requested item of video content, segments of the one or more items of interstitial content, and decryption keys for respective segments of the one or more items of interstitial content; transmitting, by the first computer system, the generated playlist manifest file, over the network by the first computer system, to the user device; receiving, by the first computer system over the network from the user device video player, a request for a first decryption key for an encrypted first segment of an item of interstitial content; at least partly based on the request for the first decryption key, determining, by the first computer system, a playback position of the video player; based at least in part on the determined playback position of the video player, determining, by the first computer system, a message; and transmitting, by the first computer system, the determined message over the network to a remote system that is a source of the interstitial content from which the first segment was segmented.

An aspect of the disclosure relates to a computer implemented method, the method comprising: receiving from a user device, over a network, a request for an item of video content at a first computer system via a network interface of the first computer system; receiving, by the first computer system, one or more items of interstitial content from one or more remote systems; segmenting, by the first computer system, the one or more of the received items of interstitial content into a plurality of segments; encrypting, by the first computer system, the plurality of segments of the one or more items of interstitial content; for a given encrypted interstitial segment, associating a corresponding decryption key with a respective locator; generating, by the first computer system, a playlist manifest file to include locator entries, the playlist manifest file comprising locators corresponding to: segments of the requested item of video content, segments of the one or more items of interstitial content, and decryption keys for respective segments of the one or more items of interstitial content; transmitting, by the first computer system, the generated playlist manifest file, over the network by the first computer system, to the user device; receiving, by the first computer system over the network from the user device video player, a request for a first decryption key for an encrypted first segment of an item of interstitial content; at least partly based on the request for the first decryption key, determining, by the first computer system, a playback position of the video player; based at least in part on the determined playback position of the video player, determining, by the first computer system, a corresponding message; and transmitting, by the first computer system, the corresponding message over the network to a remote system that is or is associated with a source of the interstitial content from which the first segment was segmented.

An aspect of the disclosure relates to a computer implemented method, the method comprising: receiving from a user device, over a network at a first computer system comprising hardware, a request for an item of video content via a network interface of the first computer system; accessing, by the first computer system, a first item of interstitial content; segmenting, by first computer system, the first item of interstitial content into a plurality of segments; for a given interstitial segment, associating, by the first computer system, a corresponding locator for an item of content related to, but different than the interstitial segment; generating, by the first computer system, a playlist manifest file to include locators corresponding to: segments of the requested item of video content, segments of the first item of interstitial content, and related items of content for respective segments of the first item of interstitial content; transmitting the generated playlist manifest file, over the network by the first computer system, to the user device; receiving over the network, by the first computer system, from the user device video player, a request for a first related item of content for a first segment of the first item of interstitial content; at least partly based on the request for the first related item of content for a first segment, determining, by the first computer system, a playback position of the video player; based at least in part on the determined playback position of the video player, determining a message; and transmitting, by the first computer system, the determined message over the network to a remote system.

An aspect of the disclosure relates to a system, comprising: a computer device; a network interface; non-transitory computer readable memory having program instructions stored thereon that when executed by the computing device cause the system to perform operations comprising: receiving from a user device, using the network interface, a request for an item of video content; receiving one or more items of interstitial content from one or more remote systems; segmenting the one or more of the received items of interstitial content into a plurality of segments; encrypting the plurality of segments of the one or more items of interstitial content; for a given encrypted interstitial segment, associating a corresponding decryption key with a respective locator; generating a manifest file to include locator entries, the manifest file comprising locators corresponding to: segments of the requested item of video content, segments of the one or more items of interstitial content, and decryption keys for respective segments of the one or more items of interstitial content; transmitting the generated manifest file, using the network interface, to the user device; receiving, using the network interface, from the user device video player a request for a first decryption key for an encrypted first segment of an item of interstitial content; at least partly based on the request for the first decryption key, determining a playback position of the video player; based at least in part on the determined playback position of the video player, transmitting a corresponding message to a remote system.

An aspect of the disclosure relates to a computer implemented method, the method comprising: receiving from a first device, using a network interface, a request for a first item of content; receiving one or more items of other content; segmenting the one or more of the received items of other content into a plurality of segments; encrypting the plurality of segments of the one or more items of other content; for a given encrypted other content segment, associating a corresponding decryption key with a respective locator; generating a file to include locator entries, the file comprising locators corresponding to: segments of the requested first item of content, segments of the one or more items of other content, and decryption keys for respective segments of the one or more items of other content; transmitting the generated file, using the network interface, to the first device; receiving, using the network interface, from the first device a request for a first decryption key for an encrypted first segment of an item of other content; at least partly based on the request for the first decryption key, determining a playback position; optionally, based at least in part on the determined playback position, transmitting a corresponding message to a remote system.

BRIEF DESCRIPTION OF THE DRAWINGS

FIG. 2B illustrates example modules and services.
FIGS. 3A-3B illustrate an example process.

Figure 1:
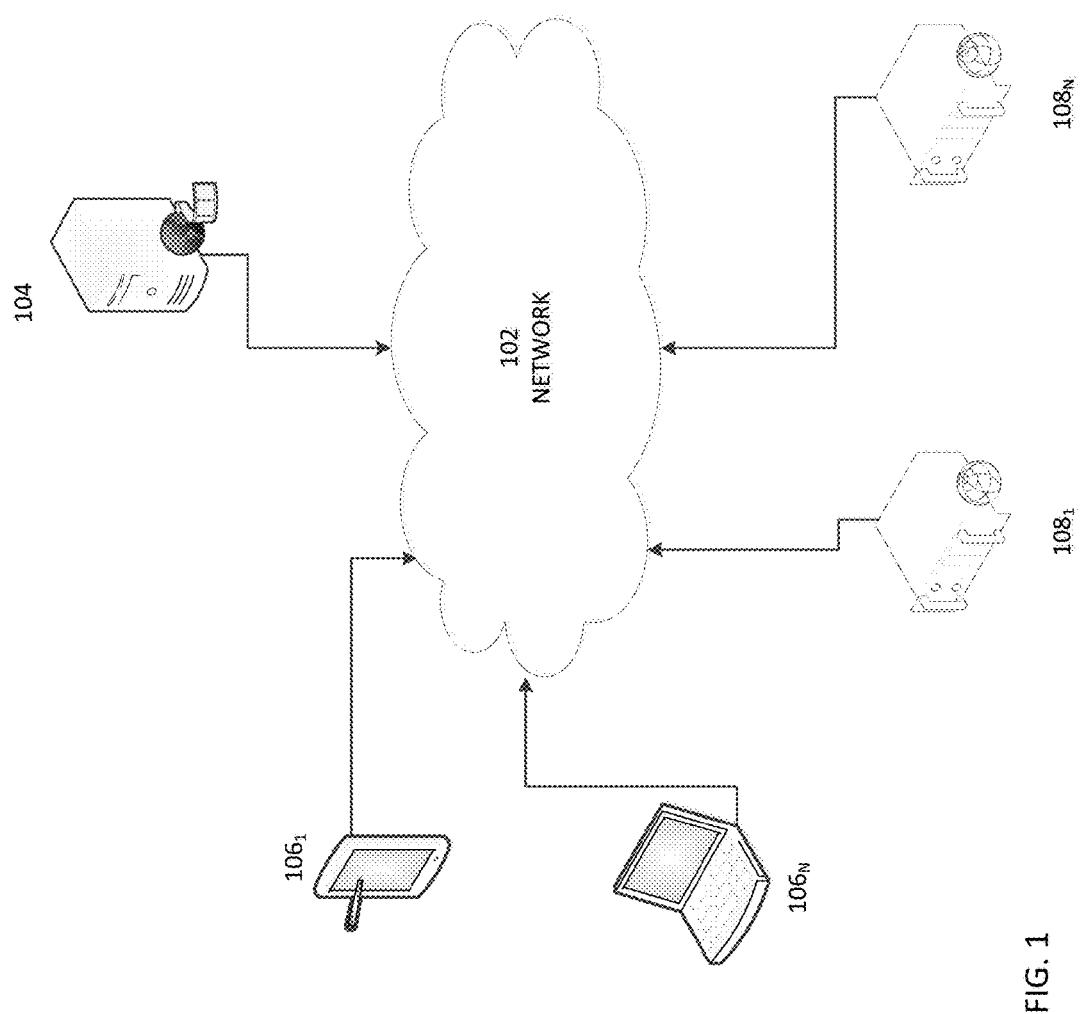
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Methods and systems are described for detecting a current video playback position (e.g., of streamed video content). Optionally, and unlike conventional systems, the current video playback position of video being played back by a third-party video player may be determined by a remote system without the use of a customized video player, and without requiring that the third-party video player utilize a video playback application programming interface (API) or plug-in to provide playback position information.

Thus, the technical problem of determining video playback position is solved without requiring customization of video players. Further, as will be described in greater detail below, encryption may be used to provide additional benefits beyond security. The use of encryption (and associated decryption keys) may be utilized to determine a playback position of media. Another problem which may be solved using the disclosure herein is the problem of video players providing false indications that an item of interstitial content has been played when the user has merely scrubbed through (e.g., fast forwarded or rewound through) the interstitial content using the video player without actually playing the interstitial content.

Optionally, the HTTP Live Streaming (HLS) communications protocol may be utilized for streaming video content. Examples of browsers that include an HLS video player include, without limitation, the Safari web browser, the Chrome browser with an HLS plugin, the Microsoft Edge browser, and the like. HLS employs the MPEG-2 Transport Stream (MP2TS).

The HLS protocol breaks a video overall stream into a sequence of relatively small HTTP-based file downloads (e.g., .ts files that include 5 seconds, 10 seconds, or other length of video content). At the start of the streaming session, an extended M3U8 playlist manifest is downloaded to the video player. The playlist manifest contains respective metadata for the various sub-streams. However, an HLS playlist manifest file comprises a simple list of video files to be played in sequence. The playlist manifest file does not provide information about the context of the stream or any form of interaction.

As will be described in greater detail herein, manifest file manipulation "stitcher" system may assemble a playlist that defines a linear sequence of individual clips, interstitials, and/or other content. The playlist effectively stitches the variety of media items into continuous video stream during playback. If the HLS protocol is being used, the stitcher system may make this stream available to video players (e.g., hosted on remote user devices) through a URL that returns a HLS .m3u8 file. The receiving video player may access and play each item of content in the defined order. The video player may be embedded in a webpage, may be a dedicated video player application ("app"), or may be part of a larger app (e.g., a game app). It is understood, while certain examples will be described with respect to the HLS protocol, other protocols, such as by way of example the MPEG DASH protocol, may be used. MPEG DASH (Dynamic Adaptive Streaming over HTTP) is a standard for adaptive streaming over HTTP. Similar to the HLS protocol, the MPEG DASH protocol generates and provides manifest files that identify the streams for the player and contain their respective URL addresses.

Thus, a stitching service provided by a stitcher system server may be utilized which stitches various items of video content to define a stream of content. The stitched video content may include primary content (e.g., a program, a movie, or the like) and supplemental content (e.g., interstitial content, such as an advertisement, public service announcement, quiz, program information, etc.).

By way of example, if the primary video content (e.g., a movie) is being streamed for playback as video on demand video content, the stitcher system may include indicators in the manifest file indicating where respective items of interstitial content are to be played. The entire manifest file, including indications of interstitial locations may be transmitted over a network to a video player hosted on the user device at the beginning of the streaming of the video content. Thus, for VOD sessions, the client video player is provided full access to the entire program with a single manifest file. However, because the single manifest file identifies all the primary content segments and interstitial locations and is static, conventionally the video player may not need to call and may not call the stitcher system server again for an updated manifest file during the playback of the video content.

Therefore, conventionally, the stitcher system server may not know the current playback position of the video content, and so may not be able to determine if an item of interstitial content has been played back. Further, the inability of determining the current playback position is exacerbated by a viewer's ability to fast forward, rewind, and pause the video stream. Because the stitcher system conventionally does not know the current playback position, at any given time, it cannot determine when to issue playback notifications to third party systems (e.g., via an ad beacon HTTP GET request) on behalf of the video player.

It would be advantageous to be able to determine the playback position of video content without requiring a customized via player, an application programming interface (API) or a plug-in for providing such information, even when the video player is not making requests for an updated manifest file. Such determination would enable a determination as to when interstitial content has been played and what percentage of the interstitial content has been played. Thus, techniques are described herein that enable a remote system to track the playback position of a video by a video player, even though the player is not making requests for an updated manifest file.

As noted above, an HLS manifest file points to a sequence of smaller video file (e.g., .ts files, such as where each .ts file represents 5 seconds, 10 seconds, or other length of video). A video file (e.g., a .ts video file) may optionally be encrypted. For example, the video file may optionally be encrypted using an AES-128 key. The format of the key file may be a packed array of 16 octets in binary format. A locator (e.g., a URL) may be associated with a decryption key, where the decryption key can be fetched at the location corresponding to the locator. The locator may point to the stitcher system (or other system), which may store the decryption key.

Optionally, in an example process, each video segment of an item of interstitial content (e.g., each .ts file) is encrypted with a unique key. Optionally, the first segment of a given video clip of primary content that is scheduled to be played immediately after interstitial content is also encrypted with a unique key. Optionally, additional segments (e.g., all the segments) of primary content may be encrypted. During video playback of a video on demand stream, the video player will detect that the first segment of primary content, after a segment of interstitial content, is encrypted, access the associated URL (or other locator) and request the decryption key using the URL in order to play the first video segment. The decryption keys may be hosted by the stitcher system or other system. The system from which the decryption key is requested will know that the first segment of primary content is about to be played and that the previous segment of interstitial content has completed playing.

For example, the system may store a mapping of URLs to corresponding video segments (e.g., first segments of primary content and segments of interstitial content). When the system receives the request at a given URL, the system may then identify the video content associated with the URL, and can thereby determine the video content currently or about to played. The system may also return the requested decryption key associated with the URL and video content. For example, if the first segment of a clip is at http://silo.pluto.tv/foo/1.ts, a corresponding entry could be included in the m3u8 file as http://stitcher.pluto.tv/redirect?map=12345. Then the system may look up "12345" and determine that "12345" points to the URL http://silo.pluto.tv/foo/1.ts, and reply with an HTTP 302-Redirect to http://silo.pluto.tv/fool.1.ts. Optionally, this process is performed only for the decryption keys and not the .ts files.

Similarly, when the video player requests a decryption key associated with a segment of interstitial content using a corresponding URL, the system receiving the request can determine that a segment of interstitial content is being played.

Optionally, the stitcher system may determine if an interstitial video segment is being decrypted while the viewer is scrubbing through the video stream or if the interstitial being decrypted during linear playback of video playback. For example, if the system determines from the URL of the requested decryption key, that a middle segment of an item of interstitial content is being decrypted before the first segment of the of interstitial content has been decrypted or requested then system may infer that the video player is scrubbing backwards through the video stream.

During a scrubbing operation (e.g., a user fast forward or rewind operation initiated using a fast forward or rewind control, or a user dragging of a scrubber control forward or backward) a conventional video player may periodically display a frame of content corresponding to the current scrubbing position. If, as may be conventional, the interstitial content were not encrypted, the video player may issue a request for the interstitial content during a scrubbing operation, hence providing a false indication that the interstitial content has been played back. This may cause false reporting and improper fees associated with such false indications. For example, if the interstitial content is an ad, a false playback indication may cause the advertiser to be improperly charged.

By contrast, a conventional video player may typically not expend computing or network resources requesting a decryption key for encrypted interstitial content during a scrubbing operation (and so will not display a frame from such interstitial content). Hence, if the interstitial content is encrypted as described herein, the conventional video player will not issue a request for an encryption key. Because the stitcher system will not receive a request for a decryption key for such interstitial content during a scrubbing operation, the stitcher system will not mistakenly report such interstitial as being watched. Thus, the techniques described herein will avoid reporting "false positives" with respect to a user viewing and playback of interstitial content.

Optionally, if the interstitial content is a video advertisement, the advertisement may be provided from a third party ad supplier that conforms to the Video Ad Serving Template (VAST) that sets a standard for communication between ad servers and video players. Conventionally, in order to play a video ad in a video player, the video player itself sends a request to a VAST ad server. Conventionally, the request is a simple HTTP based URL. The VAST ad server responds to the ad request with a VAST data structure transmitted to the video player that declares the ad content that is to be played, how the content is to be played, and what is be tracked as the content is played by the video player.

Thus, for example, ad content playback may be monitored and verified using ad beacons in the form of HTTP GET requests sent to listed URLs based on certain ad events, such as when an ad video starts playing, when 25% of the video has been played backed, when 50% of the video has been played backed, when 75% of the video has been played backed, and when 100% of the video has been played backed. When the HTTP GET request is made, the receiving server notes that the request has been received and can therefore measure the viewing of an ad video and the source of the interstitial (e.g., an ad) be charged accordingly.

Further, when a request for a decryption key is received for a segment of primary content scheduled to be played immediately after a segment of an item of interstitial content, the system determines that the previous item of interstitial content has finished playing and can issue a corresponding HTTP message (e.g., an HTTP POST message) indicating the completion of playing of the item of interstitial content.

In addition, the interstitial viewing information determined from the decryption requests may be used to track the effectiveness of the interstitial, and to infer the viewer's preferences.

Certain example aspects will now be discussed with reference to the figures. FIG. 1 illustrates an example environment. A stitching system 104 is connected to a network 102. The stitching system 104 is configured to communicate with client devices $106_1 \ldots 106_n$ that comprise video players. By way of example, the video player may be embedded in a webpage, may be a dedicated video player application, or may be part of a larger app (e.g., a game application, a word processing application, etc.). For example, as described elsewhere herein, the stitching system 104 may receive a request for media from a given client device 106 in the form of a request for a playlist manifest or updates to a playlist manifest. The stitching system 104 may identify, from a file, the location and length of an interstitial pod (a time frame reserved for interstitials, wherein one or more interstitials may be needed to fill a pod), determine context information (e.g., information regarding the primary content being requested, information regarding the user, and/or other context information), solicit and select interstitial content from third parties, encrypt content, generate playlist manifest, provide decryption keys, determine video player play position, process playback process information, and/or perform other functions described herein. The stitching system 104 and/or another system may stream requested content to the requesting device 106.

Optionally, the stitching system 104 may transmit context information to one or more interstitial source systems $108_1 \ldots 108_n$. For example, the source systems $108_1 \ldots 108_n$ may optionally include ad servers, and the interstitial content may comprise ads. The source systems $108_1 \ldots 108_n$ may comply with the VAST protocol. By way of further example, the source systems $108_1 \ldots 108_n$ may provide public service videos, previews of upcoming programs, quizzes, news, games, and/or other content. The source systems $108_1 \ldots 108_n$ may use the context information in determining what interstitial content is to be provided or offered to the requesting client device 106. Optionally, the source systems $108_1 \ldots 108_n$ may submit bids to place interstitial content in association with primary content, and the stitching system 104 may evaluate the bids and optionally based at least in part on the bids, select one or more items to insert into an interstitial pod.

Figure 2A:
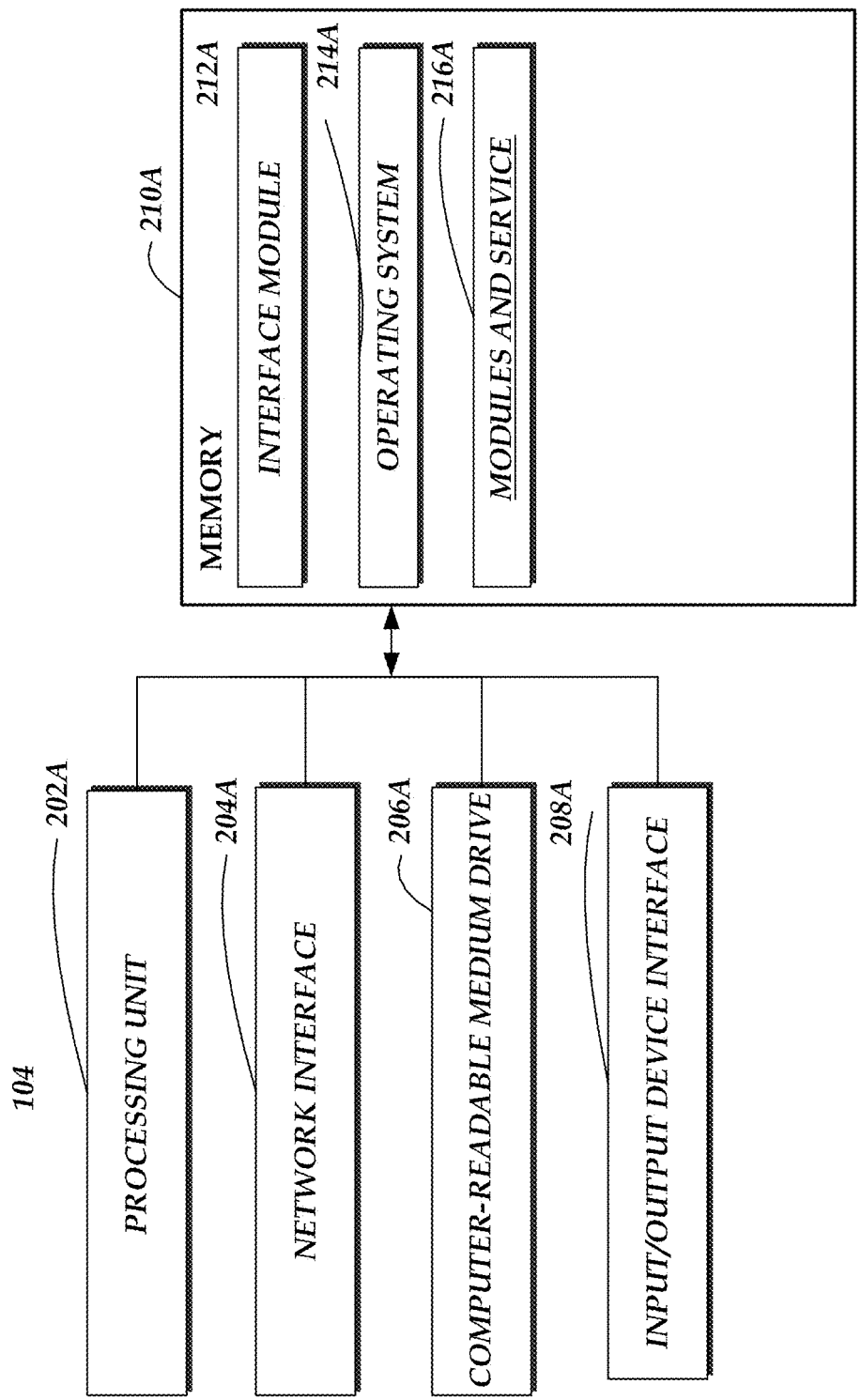
FIG. 2A is a block diagram illustrating example components.

FIG. 2A is a block diagram illustrating example components of a stitching system 104. The example stitching system 104 includes an arrangement of computer hardware and software components that may be used to implement aspects of the present disclosure. Those skilled in the art will appreciate that the example components may include more (or fewer) components than those depicted in FIG. 2A.

The stitching system 104 may include one or more processing units 202A (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 206A may provide the various services described herein with connectivity to one or more networks or computing systems. The processing unit 202A may thus receive information and instructions from other computing devices, systems, or services via a network. The processing unit 202A may also communicate to and from memory 206A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more embodiments of the present disclosure. The memory 202A generally includes RAM, ROM and/or other persistent or non-transitory computer-readable storage media. The memory 202A may store an operating system 214A that provides computer program instructions for use by the processing unit 202A in the general administration and operation of the modules and services 216A, including it components. The modules and services 216A are further discussed with respect to FIG. 2B and elsewhere herein. The memory 210A may further include other information for implementing aspects of the present disclosure.

In an example embodiment, the memory 210A includes an interface module 212A. The interface module 212A can be configured to facilitate generating one or more interfaces through which a compatible computing device, may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec. The system 104 may offload compute-intensive portions of the modules and services 216A to a dedicated video codec, while other code may run on a general purpose processor. The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, or the like, configured to facilitate data transmission to and from data stores, user terminals, and third party systems via one or more networks. Accordingly, the depictions of the modules are illustrative in nature.

Referring FIG. 2B the modules and services 216A may include modules that provide a playlist request service 202B, an interstitial selection service 204B, an encryption service 206B, a playlist manifest generation service 208B, a decryption key service 210B, a playback position determination service 212B, and a playback position reporting service 214B.

The playlist request service 202B may receive and process requests for playlist manifests. The interstitial selection service 204B may assemble content information for a given interstitial pod (e.g., the length of the interstitial pod, the subject matter of requested primary content, information regarding a channel the viewer is watching, the content of a scene in which the interstitial pod is located, etc.) and transmit the information to one or more interstitial source systems. The interstitial source systems may propose interstitial content to the interstitial selection service 204B of the stitching system. The interstitial selection service 204B may evaluate the proposals and select one or more items of interstitial content for inclusion in the interstitial pod.

The encryption service 206B may be used to encrypt primary content and/or interstitial content (e.g., content segments such as .ts files). The encryption service 206B may optionally utilized dedicated encryption hardware devices and/or software encryption. For example, the encryption service 206B may use AES-128 encryption. The manifest generation service 208B may be used to assemble a playlist manifest (e.g., an HLS or MPEG DASH manifest) including locators (e.g., URLs) pointing to segments of primary and interstitial content and locators (e.g., URLs) associated with decryption keys (which may optionally be the same as the encryption keys if symmetric encryption is used) organized to correspond to the desired playback sequence. The decryption key service receives decryption key requests via the video players accessing corresponding locators (e.g., URLs), and returns the respective decryption keys to the video player. If symmetrical encryption is used, the decryption keys may be the same as the encryption keys. If asymmetrical encryption is used, the decryption keys (e.g., private keys) are different than the encryption keys (e.g., public keys). The playback position determination service 212B uses the decryption key requests to determine the current playback location. The playback position reporting service 214B reports the playback positioning and completion of playback of interstitials (e.g. via HTTP GET requests or POST requests).

Figure 3A:
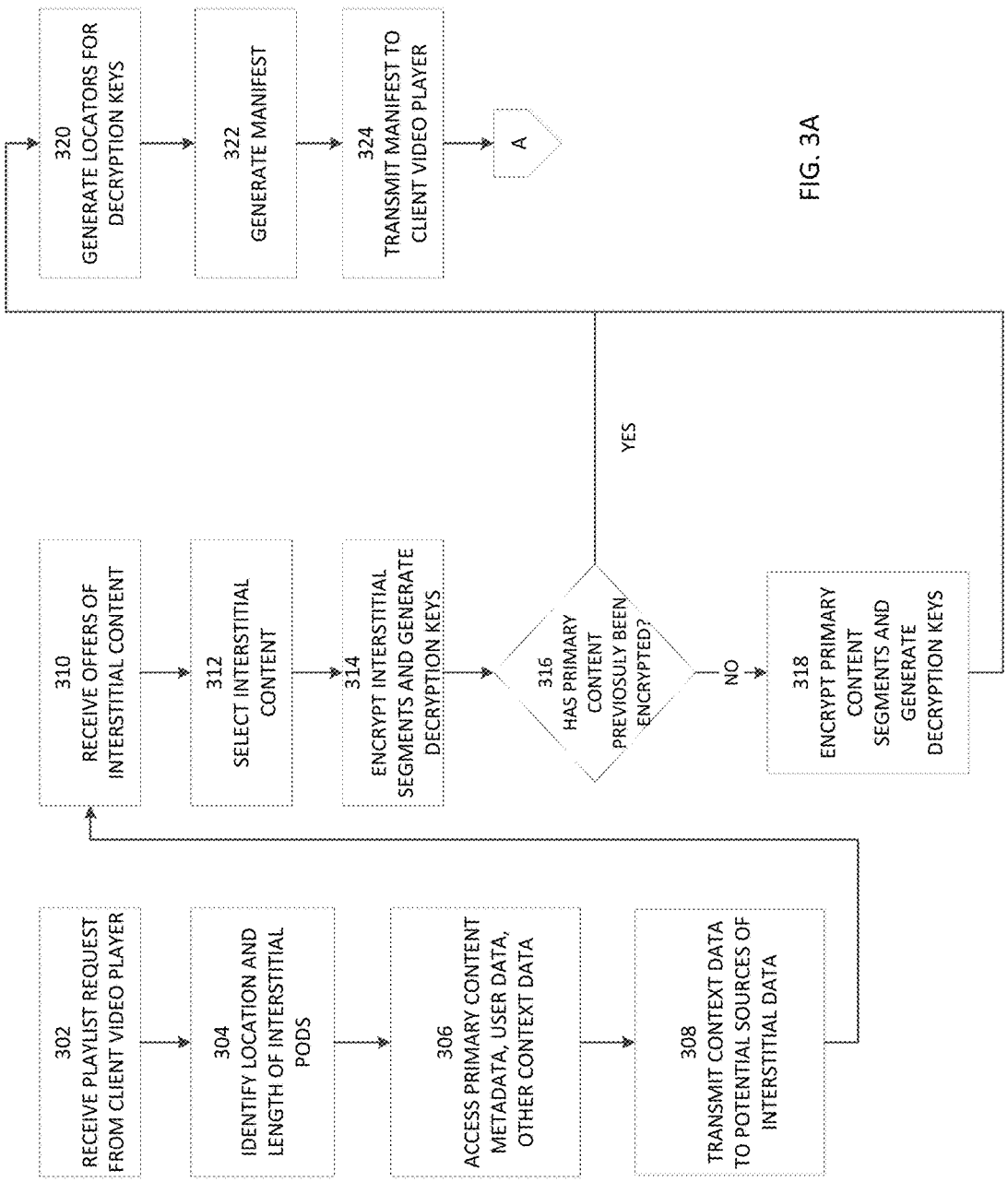

FIGS. 3A, 3B illustrate an example process. The process may optionally be implemented using the example stitcher system described elsewhere herein. At block 302, a request for a playlist manifest (e.g., an HLS .m3u8 or an MPEG DASH .mpd manifest file) is received by a stitcher system over a network (e.g., a wired or wireless network) from a video player on a user device. The request may be for an item of primary content, such as a movie. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or the request may have been automatically issued by an application. For example, if the user has completed playing a first movie (or other content), an application (e.g., such as that described in U.S. Pat. No. 9,258,589, titled "METHODS AND SYSTEMS FOR GENERATING AND PROVIDING PROGRAM GUIDES AND CONTENT," issued Feb. 9, 2016, and/or U.S. application Ser. No. 15/635,764, titled "METHODS AND SYSTEMS FOR GENERATING AND PROVIDING PROGRAM GUIDES AND CONTENT," filed Jun. 28, 2017, the contents of which are incorporated by reference in their entirety) may automatically request a manifest for the next scheduled movie (or other item of content).

The next scheduled movie may be scheduled in accordance with a program guide, where the program guide may include multiple channels (e.g., corresponding to different subject matters), where a given channel has associated programs (e.g., movies or other items of content) with scheduled start and end times. Thus, for example, a manifest for a program may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time) the corresponding playlist manifest may be automatically requested and provided to the video player.

At block 304, the location and length of interstitial pods within the requested primary content are identified. For example, the process may access a file or other metadata associated with the primary content that indicates the positions within the primary content for interstitial pods, wherein a given interstitial pod may have a specified length (e.g., 15 seconds, 30 seconds, 1 minute, 2 minutes, or other length). At block 306, context information, such as user and/or primary content information, that may be used in selecting interstitial content for interstitial pods may be determined or collected.

For example, the process may optionally access (e.g., from a user data record) or determine user information, such as, by way of example, user demographics (e.g., age, gender, geographical location, income, number of household members, languages spoken), user purchase history, user navigation and viewing history, expressed user preferences, inferred user preferences, historical interstitial interactions information, user device model, user device type (e.g., phone, tablet, laptop, desktop computer, television streaming media player, etc.), user browser, and/or the like. The process may optionally determine a user's social networking contacts and access or determine some or all of the same information for one or more of such contacts. The process may optionally access (e.g., from associated metadata) or determine information regarding the primary content the user is requesting, such as title, category, genre, rating, products or services depicted in the primary content (and optionally at what point in time or what frames those products or services depicted), and/or the like.

At block 308, some or all of the context information is optionally transmitted to one or more potential sources for interstitial content (e.g., one or more remote systems). Optionally, a desired length for the interstitial content is also transmitted to the potential sources for interstitial content. Optionally, a separate message transmission is made for each interstitial pod. Optionally, a complete listing of all the interstitial pods and associated information are included in the same message.

The desired length may be the time length of the entire interstitial pod (e.g., 60 seconds) or a shorter length (e.g., 30 seconds, where two 30 second interstitials may be used to fill a given interstitial pod).

Optionally, the potential sources for interstitial content may use the context information in determining whether to offer interstitial content and which interstitial content to offer. For example, if a potential source for interstitial content is an ad server, the ad server may determine whether the context information matches any ad specifications, and if so, the ad server may optionally determine a bid for placement of the interstitial content.

At block 310, offers of interstitial content are received. The offers may include the interstitial content and/or metadata describing the interstitial content (e.g., the genre, subject matter, length, etc.). The offers may optionally include bids (e.g., of a specified amount) for placement of the interstitial content. At block 312, the offers of interstitial content are evaluated (e.g., based on the content metadata and/or bid), and interstitial content is selected for the interstitial pods.

At block 314, the interstitial content is encrypted. For example, a given item of interstitial content (e.g., a video ad) may be segmented (e.g., into 2 second, 5 second, or 10 second .ts segments). A given segment is encrypted (e.g., using an AES-128 key or public key cryptography/asymmetrical cryptography). If symmetric encryption is used, than the encryption key and the decryption key may be the same key. If public key cryptography/asymmetrical cryptography is used, then a public key may be used to encrypt the interstitial content and a private key may be generated to decrypt the interstitial content. Optionally, each interstitial segment has a different decryption key.

At block 316, a determination is made as to whether the primary content has already been segmented and encrypted in a form compatible with the requested user device. Different transcoding may need to be performed for different devices and different display sizes (e.g., 10.1 inch tablet display, 5.4 inch phone display, etc.).

For example, if another user previously requested the same item of primary content, the process may have previously transcoded, segmented and encrypted the primary content, and stored the associated encrypted primary content and decryption key in memory for latter access in associated with a primary content identifier (e.g., a name or a unique code that uniquely identifies the primary content). As similarly discussed above, the primary content may be encrypted using synchronous encryption (e.g., using an AES key) or public key cryptography/asymmetrical cryptography (which may use a public key for encryption and a private key for decryption).

If encrypted primary content is not available for the user device, then at block 318, the primary content is segmented (e.g., as .ts files) and the segments are encrypted. As similarly discussed above, the primary content may be encrypted using symmetrical encryption (e.g., using an AES key) or public key cryptography/asymmetrical cryptography (which may use a public key for encryption and a private key for decryption). Optionally, each segment has a different decryption key. The processes performed at blocks 314, 316, and 318 may optionally be performed when a given interstitial is being prepared for production.

At block 320, locators (e.g., URLs) are generated for respective segment decryption keys (which may be the same as the respect segment encryption keys). The same decryption keys may be used for multiple (e.g., all) users. However, optionally, a different locator is generated for each decryption key. For example, the locator may include context information some or all of which may be unique for a given playback instance. Context information may include some or all of the following: session id, interstitial pod identifier/number, interstitial index, percentage of interstitial played, and/or the like.

At block 322, a playlist manifest file is generated. For example, the manifest file may be an HLS .m3u8 or an MPEG DASH .mpd manifest file. The manifest file may include locators (URLs) for each primary content and interstitial segment in the desired playback order. The manifest file may include the entire playlist for the requested content. The manifest file may include, in the appropriate sequence location, decryption key locators (e.g., URLs), which may be identified using tags, and an encryption type may be identified. For example, an EXT-X-KEY tag may optionally be used to identify encrypted content, as in the following example of a manifest:

EXTM3U {which is a format descriptor}
EXT-X-TARGETDURATION:10 {which specifies the duration of the media segment in seconds}
EXT-X-VERSION:3 {which indicates the compatibility version of the playlist file when specifying floating point EXTINF durations}
EXT-X-PLAYLIST-TYPE:VOD {which indicates that the playlist is for a video on demand item of content}
EXTINF:4.0000, media3-2590000-1.ts {where #EXTINF:" serves as a record marker, the number after the color provides the length of the track in whole seconds, and the name of the file follows the comma}
EXTINF:4.0000,
media3-2590000-2.ts
EXT-X-KEY:METHOD=AES-128,
URI="F4zBwxSz.key",
IV=0x00000000000000000000000000000001
EXTINF:4.0000,
media3-2590000-3.ts
EXTINF:4.0000, media3-2590000-4.ts
EXTINF:4.0000,
media3-2590000-5.ts
EXT-X-KEY:METHOD=AES-128,
URI="F4zBwxSz2.key",
IV=0x00000000000000000000000000000001
EXTINF:4.0000,
media3-2590000-6.ts
EXTINF:4.0000,
media3-2590000-7.ts
EXTINF:4.0000,
media3-2590000-8.ts
EXT-X-KEY:METHOD=NONE
EXTINF:4.0000,
media3-2590000-9.ts
EXTINF:4.0000,
media3-2590000-10.ts
EXT-X-ENDLIST With respect to the following example extracted from the above example manifest:
'#EXT-X-KEY:METHOD=AES-128,
URI="F4zBwxSz.key",
IV=0x00000000000000000000000000000001'

METHOD identifies the encryption method (e.g., AES-128);

URI (Uniform Resource Identifier) identifies the key source;

IV is an Initialization Vector which may be 16 random bytes.

In this case the URL is relative to the source directory. So if for example that sequence above was retrieved from http://silo.pluto.tv/some/directory/master.m3u8 then the key file would be at http://silo.pluto.tv/some/directory/F4zBwxSz.key.

The URL can also be absolute, as in the following example:
URI="http://silo.pluto.tv/some/other/directory/F4zBwxSz.key"
EXT-X-KEY:METHOD=AES-128,URL="https://cats.pluto.tv/key.php?r=24", At block 324, the manifest file is transmitted to the video player on the user device. At block 326, a request for a decryption key is received from the video player on the user device. Thus, for example, if the video player is about to play a segment of interstitial content, the video player will request the corresponding decryption key and segment content by accessing the corresponding URL specified in the manifest file. The process may access the key corresponding to the URL and transmit the decryption key to the video player.

At block 328, the process determines the current video player playback position based on the requested decryption key. For example, the stitching system may include a table or other data structure that maps session streams, URLs, decryption keys, and/or playback position (e.g., as measured by percentage of the content played back, or as measured by the current playback position in terms of time). At block 330, a determination is made as to whether the requested segment is a segment of interstitial content. Optionally, the determination may be made using the determined current playback position and a mapping of playback position to content. Optionally the determination may be made based on a mapping of URL to content type (e.g., interstitial content type, primary content type).

At block 330, the process may issue a notification to the source of the item of interstitial content (e.g., an ad server). The notification may optionally be provided by transmitting an HTTP GET request (e.g., an ad beacon HTTP GET request) to the interstitial source system (e.g., to a corresponding URL associated with the ad server). At block 332, a playback progress communication may be received from the video player. For example, the playback progress communication may be a request for a subsequent segment of the item interstitial content. The process may determine from the URL of the subsequent segment the percentage of the item of interstitial content that has been played back (e.g., 25%, 50%, 75%). At block 334, a progress indication is transmitted to the interstitial source (e.g., by transmitting an ad beacon HTTP GET request using the corresponding URL).

If a determination is made at block 330 that the requested segment is for an encrypted primary content segment (rather than an interstitial segment), a determination is made at block 336 as whether the immediately preceding requested segment was an interstitial segment. For example, the process may keep a history of played-back segments. The history may include one or more segments, such as all the played segments associated with the manifest, or just the last played segment. The process may examine the history to determine whether the immediately preceding requested segment was an interstitial segment.

If the immediately preceding requested segment was an interstitial segment, then at block 338, the process infers that the previous playing item of interstitial content has completed playing and may transmit a corresponding notification to the interstitial source system (e.g., by transmitting an ad beacon HTTP GET request using the corresponding URL). One or more actions may be taken based on the completion determination. For example, if the item of interstitial content is an ad, the completion determination may trigger a payment event.

Although certain above examples refer to the using requests for encryption keys to determine a playback position of video content by a video player, other types of video player requests may be utilized. For example, a manifest transmitted by a remote system to the video player may include respective unique locators to corresponding items of closed caption content. Requests by the video player for such closed caption content may be utilized to determine the video player playback position.

Thus, as described herein, encryption techniques may be utilized to determine the current video playback position of video by a remote system without the use of a customized video player.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer implemented method of determining a playback position of content being played by video player on a remote user device, the method comprising:
  receiving from the user device, over a network, a request for an item of video content at a first computer system via a network interface of the first computer system;
  accessing, by the first computer system, user information and/or metadata corresponding to the item of video content;
  transmitting, by the first computer system, at least a portion of the user information and/or metadata corresponding to the item of video content to one or more remote systems;

receiving, by the first computer system, one or more items of interstitial content from one or more of the remote systems;
segmenting, by the first computer system, the one or more items of interstitial content into a plurality of segments;
encrypting, by the first computer system, the plurality of segments of the one or more items of interstitial content;
for a given encrypted interstitial segment, associating, by the first computer system, a corresponding decryption key with a respective URL;
generating, by the first computer system, a playlist manifest file to include URL entries in a playback sequence, the playlist manifest file comprising URLs corresponding to:
  segments of the requested item of video content,
  segments of the one or more items of interstitial content, and
  decryption keys for respective segments of the one or more items of interstitial content;
transmitting, by the first computer system, the generated playlist manifest file, over the network by the first computer system, to the user device;
receiving, by the first computer system over the network from the user device video player, a request for a first decryption key for an encrypted first segment of an item of interstitial content;
at least partly based on the request for the first decryption key, determining, by the first computer system, a playback position of the video player;
based at least in part on the determined playback position of the video player, determining, by the first computer system, a message; and
transmitting, by the first computer system, the determined message over the network to a remote system that is a source of the interstitial content from which the first segment was segmented.

2. The computer implemented method as defined in claim 1, wherein encrypting the plurality of segments of the one or more items of interstitial content further comprises using symmetric encryption.

3. The computer implemented method as defined in claim 1, the method further comprising:
  segmenting the requested item of video content into a plurality of segments;
  identifying segments of the requested item of video content that are to be played by the video player immediately after a respective segment of interstitial content;
  encrypting the identified segments of the requested item of video content that are to be played by the video player immediately after a respective segment of interstitial content; and
  including, in the playlist manifest file, URLs corresponding to decryption keys for respective encrypted segments of the requested item of video content that are to be played by the video player immediately after a respective segment of interstitial content.

4. The computer implemented method as defined in claim 1, the method further comprising:
  segmenting the requested item of video content into a plurality of segments;
  identifying segments of the requested item of video content that are to be played by the video player immediately after a respective segment of interstitial content;
  encrypting the identified segments of the requested item of video content that are to be played by the video player immediately after a respective segment of interstitial content;
  including, in the playlist manifest file, URLs corresponding to decryption keys for respective encrypted segments of the requested item of video content that are to be played by the video player immediately after a respective segment of interstitial content;
  receiving, over the network from the user device video player, a request for a decryption key for a first of the encrypted segments of the requested item of video content that are to be played by the video player immediately after a respective segment of interstitial content;
  at least partly based on the request for the decryption key for the first of the encrypted segments of the requested item of video content, determining a message indicating that an immediately preceding item of interstitial content has been played by the video player; and
  transmitting the determined message, indicating that the immediately preceding item of interstitial content has been played by the video player, over the network to a remote system.

5. The computer implemented method as defined in claim 1, the method further comprising:
  determining that the requested item of video content has previously been segmented and encrypted;
  at least partly in response to determining that the requested item of video content has previously been segmented and the segments encrypted:
  including, in the playlist manifest file, URLs corresponding to decryption keys for at least respective encrypted segments of the requested item of video content that are to be played by the video player immediately after a respective segment of interstitial content.

6. The computer implemented method as defined in claim 1, wherein the generated playlist manifest file comprises an entry for an encrypted first segment of a first item of interstitial content and an entry for an encrypted second segment of the first item of interstitial content, wherein the second segment entry is positioned after the first segment entry in the playlist manifest file, the method further comprising:
  receiving, by the first computer system, a request from the video player for a decryption key for the second segment of the first item of interstitial content;
  after receiving the request from the video player for a decryption key for the second segment of the first item of interstitial content, determining that a request from the video player for a decryption key for the first segment of the first item of interstitial content has not been received; and
  based at least in part on the determination that a request from the video player for a decryption key for the first segment of the first item of interstitial content has not yet been received, determining that the first item of interstitial content is being scrubbed through by the video player.

7. The computer implemented method as defined in claim 1, wherein the generated playlist manifest file comprises an entry for an encrypted first segment of a first item of interstitial content, an entry for an encrypted second segment of the first item of interstitial content, and an entry for an encrypted third segment of the first item of interstitial content, wherein the second segment entry is positioned after the first segment entry in the playlist manifest file, and the third segment entry is positioned after the second segment entry in the playlist manifest file, the method further comprising:
  receiving, by the first computer system, a request from the video player for a decryption key for the first segment of the first item of interstitial content;
  receiving, by the first computer system, a request from the video player for a decryption key for the third segment of the first item of interstitial content;
  after receiving the request from the video player for a decryption key for the third segment of the first item of interstitial content, determining that a request from the video player for a decryption key for the second segment of the first item of interstitial content has not been received; and
  based at least in part on the determination that a request from the video player for a decryption key for the second segment of the first item of interstitial content has not been received, determining that the first item of interstitial content is being scrubbed through by the video player.

8. The computer implemented method as defined in claim 1, wherein the requested item of video content is video on-demand content, and the generated playlist manifest file includes a playlist for the entire item of video content.

9. The computer implemented method as defined in claim 1, wherein the requested item of video content is scheduled to be streamed to the video player at a starting time in accordance with a preexisting program schedule, wherein the requested item of video content is requested automatically at least partly in response to determining a current time corresponds to the scheduled starting time.

10. A computer implemented method, the method comprising:
  receiving from a user device, over a network, a request for an item of video content at a first computer system via a network interface of the first computer system;
  receiving, by the first computer system, one or more items of interstitial content from one or more remote systems;
  segmenting, by the first computer system, the one or more of the received items of interstitial content into a plurality of segments;
  encrypting, by the first computer system, the plurality of segments of the one or more items of interstitial content;
  for a given encrypted interstitial segment, associating a corresponding decryption key with a respective locator;
  generating, by the first computer system, a playlist manifest file to include locator entries, the playlist manifest file comprising locators corresponding to;
  segments of the requested item of video content,
  segments of the one or more items of interstitial content, and
  decryption keys for respective segments of the one or more items of interstitial content;
  transmitting, by the first computer system, the generated playlist manifest file, over the network by the first computer system, to the user device;
  receiving, by the first computer system over the network from a user device video player, a request for a first decryption key for an encrypted first segment of an item of interstitial content;
  at least partly based on the request for the first decryption key, determining, by the first computer system, a playback position of the video player;
  based at least in part on the determined playback position of the video player, determining, by the first computer system, a corresponding message; and
  transmitting, by the first computer system, the corresponding message over the network to a remote system that is or is associated with a source of the interstitial content from which the first segment was segmented.

11. The computer implemented method as defined in claim 10, the method further comprising:
  segmenting the requested item of video content into a plurality of segments;
  identifying segments of the requested item of video content that are to be played by the video player immediately after a respective segment of interstitial content;
  encrypting the identified segments of the requested item of video content that are to be played by the video player immediately after a respective segment of interstitial content; and
  including, in the playlist manifest file, locators corresponding to decryption keys for respective encrypted segments of the requested item of video content that are to be played by the video player immediately after a respective segment of interstitial content.

12. The computer implemented method as defined in claim 10, the method further comprising:
  segmenting the requested item of video content into a plurality of segments;
  identifying segments of the requested item of video content that are to be played by the video player immediately after a respective segment of interstitial content;
  encrypting the identified segments of the requested item of video content that are to be played by the video player immediately after a respective segment of interstitial content;
  including, in the playlist manifest file, locators corresponding to decryption keys for respective encrypted segments of the requested item of video content that are to be played by the video player immediately after a respective segment of interstitial content;
  receiving, over the network from the user device video player, a request for a decryption key for a first of the encrypted segments of the requested item of video content that are to be played by the video player immediately after a respective segment of interstitial content;
  at least partly based on the request for the decryption key for the first of the encrypted segments of the requested item of video content, transmitting a message, indicating that the immediately preceding item of interstitial content has been played by the video player, over the network to a remote system.

13. The computer implemented method as defined in claim 10, the method further comprising:
  determining that the requested item of video content has previously been segmented and encrypted; and
  at least partly in response to determining that the requested item of video content has previously been segmented and the segments encrypted:
  including, in the playlist manifest file, locators corresponding to decryption keys for respective encrypted segments of at least the requested item of video content that are to be played by the video player immediately after a respective segment of interstitial content.

14. The computer implemented method as defined in claim 10, wherein the generated playlist manifest file comprises an entry for an encrypted first segment of a first item of interstitial content and an entry for an encrypted second segment of the first item of interstitial content, wherein the second segment entry is positioned after the first segment entry in the playlist manifest file, the method further comprising:

receiving, by the first computer system, a request from the video player for a decryption key for the second segment of the first item of interstitial content;

after receiving the request from the video player for a decryption key for the second segment of the first item of interstitial content, determining that a request from the video player for a decryption key for the first segment of the first item of interstitial content has not been received; and based at least in part on the determination that a request from the video player for a decryption key for the first segment of the first item of interstitial content has not been received, determining that the first item of interstitial content is being scrubbed through by the video player.

15. The computer implemented method as defined in claim 10, wherein the generated playlist manifest file comprises an entry for an encrypted first segment of a first item of interstitial content, an entry for an encrypted second segment of the first item of interstitial content, and an entry for an encrypted third segment of the first item of interstitial content, wherein the second segment entry is positioned after the first segment entry in the playlist manifest file, and the third segment entry is positioned after the second segment entry in the playlist manifest file, the method further comprising:

receiving, by the first computer system, a request from the video player for a decryption key for the first segment of the first item of interstitial content;

receiving, by the first computer system, a request from the video player for a decryption key for the third segment of the first item of interstitial content;

after receiving the request from the video player for a decryption key for the third segment of the first item of interstitial content, determining that a request from the video player for a decryption key for the second segment of the first item of interstitial content has not been received; and based at least in part on the determination that a request from the video player for a decryption key for the second segment of the first item of interstitial content has not been received, determining that the first item of interstitial content is being scrubbed through by the video player.

16. The computer implemented method as defined in claim 10, wherein the locators included in the playlist manifest file comprise URLs.

17. A computer implemented method, the method comprising:

receiving from a user device, over a network at a first computer system comprising hardware, a request for an item of video content via a network interface of the first computer system;

accessing, by the first computer system, a first item of interstitial content;

segmenting, by first computer system, the first item of interstitial content into a plurality of segments;

for a given interstitial segment, associating, by the first computer system, a corresponding locator for an item of content related to, but different than the interstitial segment;

segmenting the requested item of video content into a plurality of segments;

identifying segments of the requested item of video content that are to be played by the video player immediately after a respective segment of interstitial content;

associating related items of content to the identified segments of the requested item of video content that are to be played by the video player immediately after a respective segment of interstitial content;

generating, by the first computer system, a playlist manifest file to include locators corresponding to:
segments of the requested item of video content,
segments of the first item of interstitial content, and
related items of content for respective segments of the first item of interstitial content;

including, in the playlist manifest file, locators corresponding to the associated related items of content to the identified segments of the requested item of video content;

transmitting the generated playlist manifest file, over the network by the first computer system, to the user device;

receiving over the network, by the first computer system, from a user device video player, a request for a first related item of content for a first segment of the first item of interstitial content;

at least partly based on the request for the first related item of content for the first segment of the first item of interstitial content, determining, by the first computer system, a playback position of the video player;

based at least in part on the determined playback position of the video player, determining a message; and transmitting, by the first computer system, the determined message over the network to a remote system;

receiving, over the network from the user device video player, a request for a related item of content for a first of the segments of the requested item of video content that are to be played by the video player immediately after a respective segment of interstitial content;

at least partly based on the request for the related item of content for the first of the segments of the requested item of video content, transmitting a message, indicating that the immediately preceding item of interstitial content has been played by the video player, over the network to a remote system.

18. A computer implemented method, the method comprising:

receiving from a user device, over a network at a first computer system comprising hardware, a request for an item of video content via a network interface of the first computer system;

accessing, by the first computer system, a first item of interstitial content;

segmenting, by first computer system, the first item of interstitial content into a plurality of segments;

for a given interstitial segment, associating, by the first computer system, a corresponding locator for an item of content related to, but different than the interstitial segment;

generating, by the first computer system, a playlist manifest file to include locators corresponding to:
segments of the requested item of video content,
segments of the first item of interstitial content, and
related items of content for respective segments of the first item of interstitial content;

transmitting the generated playlist manifest file, over the network by the first computer system, to the user device;
receiving over the network, by the first computer system, from a user device video player, a request for at least one related item of content for a corresponding segment of the first item of interstitial content;
at least partly based on the request for the at least one related item of content for a corresponding segment of the first item of interstitial content, determining, by the first computer system, a playback position of the video player;
based at least in part on the determined playback position of the video player, determining a message; and
transmitting, by the first computer system, the determined message over the network to a remote system,
wherein the generated playlist manifest file comprises an entry for a first related item of content for a first segment of a first item of interstitial content and an entry for a second related item of content for a second segment of the first item of interstitial content, wherein the second related item of content entry is positioned in the playlist manifest file after the first related item of content entry, the method further comprising:
receiving, by the first computer system, a request from the video player for the second related item of content;
after receiving the request from the video player for the second related item of content, determining that a request from the video player for the first related item of content has not been received; and
based at least in part on the determination that a request from the video player for the first related item of content has not been received, determining that the first item of interstitial content is being scrubbed through by the video player.

19. A computer implemented method, the method comprising:
receiving from a user device, over a network at a first computer system comprising hardware, a request for an item of video content via a network interface of the first computer system;
accessing, by the first computer system, a first item of interstitial content;
segmenting, by first computer system, the first item of interstitial content into a plurality of segments;
for a given interstitial segment, associating, by the first computer system, a corresponding locator for an item of content related to, but different than the interstitial segment;
generating, by the first computer system, a playlist manifest file to include locators corresponding to:
segments of the requested item of video content,
segments of the first item of interstitial content, and
related items of content for respective segments of the first item of interstitial content;
transmitting the generated playlist manifest file, over the network by the first computer system, to the user device;
receiving over the network, by the first computer system, from a user device video player, a request for a first related item of content for a first segment of the first item of interstitial content;
at least partly based on the request for the first related item of content for the first segment of the first item of interstitial content, determining, by the first computer system, a playback position of the video player;
based at least in part on the determined playback position of the video player, determining a message; and
transmitting, by the first computer system, the determined message over the network to a remote system;
wherein the generated playlist manifest file comprises an entry for the first related item of content for the first segment of a first item of interstitial content, an entry for a second related item of content for a second segment of the first item of interstitial content, and an entry for a third related item of content for a third segment of the first item of interstitial content, wherein the second related item of content entry is positioned in the playlist manifest file after the first related item of content entry, and wherein the third related item of content entry is positioned in the playlist manifest file after the second related item of content entry, the method further comprising:
receiving, by the first computer system, a request from the video player for the third related item of content;
after receiving the request from the video player for the third related item of content, determining that a request from the video player for the second related item of content has not been received; and
based at least in part on the determination that a request from the video player for the third related item of content has not been received, determining that the first item of interstitial content is being scrubbed through by the video player.

20. A computer implemented method, the method comprising:
receiving from a user device, over a network at a first computer system comprising hardware, a request for an item of video content via a network interface of the first computer system;
accessing, by the first computer system, a first item of interstitial content;
segmenting, by first computer system, the first item of interstitial content into a plurality of segments;
for a given interstitial segment, associating, by the first computer system, a corresponding locator for an item of content related to, but different than the interstitial segment;
generating, by the first computer system, a playlist manifest file to include locators corresponding to:
segments of the requested item of video content,
segments of the first item of interstitial content, and
related items of content for respective segments of the first item of interstitial content;
transmitting the generated playlist manifest file, over the network by the first computer system, to the user device;
receiving over the network, by the first computer system, from a user device video player, a request for a first related item of content for a first segment of the first item of interstitial content;
at least partly based on the request for the first related item of content for the first segment of the first item of interstitial content, determining, by the first computer system, a playback position of the video player;
based at least in part on the determined playback position of the video player, determining a message; and
transmitting, by the first computer system, the determined message over the network to a remote system,
wherein a given item of content related to, but different than a given interstitial segment, comprises a decryption key.

21. A system, comprising:
a computer device;
a network interface;
non-transitory computer readable memory having program instructions stored thereon that when executed by the computing device cause the system to perform operations comprising:
receiving from a user device, using the network interface, a request for an item of video content;
receiving one or more items of interstitial content from one or more remote systems;
segmenting the one or more of the received items of interstitial content into a plurality of segments;
encrypting the plurality of segments of the one or more items of interstitial content;
for a given encrypted interstitial segment, associating a corresponding decryption key with a respective locator;
generating a manifest file to include locator entries, the manifest file comprising locators corresponding to:
segments of the requested item of video content,
segments of the one or more items of interstitial content, and
decryption keys for respective segments of the one or more items of interstitial content;
transmitting the generated manifest file, using the network interface, to the user device;
receiving, using the network interface, from a user device video player a request for a first decryption key for an encrypted first segment of an item of interstitial content;
at least partly based on the request for the first decryption key, determining a playback position of the video player;
based at least in part on the determined playback position of the video player, transmitting a corresponding message to a remote system.

22. The system as defined in claim 21, the operations further comprising:
segmenting the requested item of video content into a plurality of segments;
identifying segments of the requested item of video content that are to be played by the video player immediately after a respective segment of interstitial content;
encrypting the identified segments of the requested item of video content that are to be played by the video player immediately after a respective segment of interstitial content; and
including, in the manifest file, locators corresponding to decryption keys for respective encrypted segments of the requested item of video content that are to be played by the video player immediately after a respective segment of interstitial content.

23. The system as defined in claim 21, the operations further comprising:
segmenting the requested item of video content into a plurality of segments;
identifying segments of the requested item of video content that are to be played by the video player immediately after a respective segment of interstitial content;
encrypting the identified segments of the requested item of video content that are to be played by the video player immediately after a respective segment of interstitial content;
including, in the manifest file, locators corresponding to decryption keys for respective encrypted segments of the requested item of video content that are to be played by the video player immediately after a respective segment of interstitial content;
receiving, over the network from the user device video player, a request for a decryption key for a first of the encrypted segments of the requested item of video content that are to be played by the video player immediately after a respective segment of interstitial content;
at least partly based on the request for the decryption key for the first of the encrypted segments of the requested item of video content, transmitting a message, indicating that the immediately preceding item of interstitial content has been played by the video player, over the network to a remote system.

24. The system as defined in claim 21, the operations further comprising:
determining that the requested item of video content has previously been segmented and encrypted; and
at least partly in response to determining that the requested item of video content has previously been segmented and the segments encrypted:
including, in the manifest file, locators corresponding to decryption keys for respective encrypted segments of at least the requested item of video content that are to be played by the video player immediately after a respective segment of interstitial content.

25. The system as defined in claim 21, wherein the generated manifest file comprises an entry for an encrypted first segment of a first item of interstitial content and an entry for an encrypted second segment of the first item of interstitial content, wherein the second segment entry is positioned after the first segment entry in the manifest file, the operations further comprising:
receiving a request from the video player for a decryption key for the second segment of the first item of interstitial content;
after receiving the request from the video player for a decryption key for the second segment of the first item of interstitial content, determining that a request from the video player for a decryption key for the first segment of the first item of interstitial content has not been received; and
based at least in part on the determination that a request from the video player for a decryption key for the first segment of the first item of interstitial content has not been received, determining that the first item of interstitial content is being scrubbed through by the video player.

26. The system as defined in claim 21, wherein the generated manifest file comprises an entry for an encrypted first segment of a first item of interstitial content, an entry for an encrypted second segment of the first item of interstitial content, and an entry for an encrypted third segment of the first item of interstitial content, wherein the second segment entry is positioned after the first segment entry in the manifest file, and the third segment entry is positioned after the second segment entry in the manifest file, the operations further comprising:
receiving a request from the video player for a decryption key for the first segment of the first item of interstitial content;
receiving a request from the video player for a decryption key for the third segment of the first item of interstitial content;

after receiving the request from the video player for a decryption key for the third segment of the first item of interstitial content, determining that a request from the video player for a decryption key for the second segment of the first item of interstitial content has not been received; and based at least in part on the determination that a request from the video player for a decryption key for the second segment of the first item of interstitial content has not been received, determining that the first item of interstitial content is being scrubbed through by the video player.

27. The system as defined in claim 21, wherein the locators included in the manifest file comprise URLs.

* * * * *

UNITED STATES PATENT AND TRADEMARK OFFICE
CERTIFICATE OF CORRECTION

PATENT NO. : 10,356,447 B2  
APPLICATION NO. : 15/714931  
DATED : July 16, 2019  
INVENTOR(S) : Spencer Shanson Page 1 of 1

It is certified that error appears in the above-identified patent and that said Letters Patent is hereby corrected as shown below:

In the Drawings

In sheet 4 of 5, Figure 3A, reference numeral 316, Line 3, delete "PREVIOSULY" and insert -- PREVIOUSLY --.

In the Specification

In Column 6, Line 47, delete "fool.1.ts." and insert -- foo/1.ts. --.

In Column 6, Line 61, delete "of the of" and insert -- of the --.

In the Claims

In Column 19, Line 52, Claim 10, delete "to;" and insert -- to: --.

Signed and Sealed this  
Fifteenth Day of October, 2019

Andrei Iancu  
*Director of the United States Patent and Trademark Office*